US012559328B2

(12) United States Patent　　　(10) Patent No.: US 12,559,328 B2
Kramer　　　　　　　　　　　　　(45) Date of Patent: Feb. 24, 2026

(54) SEPARATOR FOR SEPARATING A CONVEYED MEDIUM, PREFERABLY AIR, FROM A CONVEYED MATERIAL, AND METHOD FOR SEPARATING CONVEYED MATERIAL FROM A CONVEYED MEDIUM/CONVEYED MATERIAL MIXTURE

(71) Applicant: Walter Kramer, Hünenberg See (CH)

(72) Inventor: Walter Kramer, Hünenberg See (CH)

( * ) Notice: Subject to any disclaimer, the term of this patent is extended or adjusted under 35 U.S.C. 154(b) by 445 days.

(21) Appl. No.: 17/910,366

(22) PCT Filed: Feb. 19, 2021

(86) PCT No.: PCT/EP2021/000018
§ 371 (c)(1),
(2) Date: Sep. 9, 2022

(87) PCT Pub. No.: WO2021/180356
PCT Pub. Date: Sep. 16, 2021

(65) Prior Publication Data
US 2023/0129108 A1　Apr. 27, 2023

(30) Foreign Application Priority Data
Mar. 11, 2020　(DE) ..................... 10 2020 001 716.9

(51) Int. Cl.
*B01D 45/08*　　(2006.01)
*B65G 53/60*　　(2006.01)

(52) U.S. Cl.
CPC ............. *B65G 53/60* (2013.01); *B01D 45/08* (2013.01)

(58) Field of Classification Search
CPC .................................. B65G 53/60; B01D 45/08
See application file for complete search history.

(56) References Cited

U.S. PATENT DOCUMENTS 4,583,885 A　4/1986　Thiele
4,975,100 A * 12/1990　Ginelli ................... B01D 45/12
　　　　　　　　　　　　　　　　　406/28

(Continued)

FOREIGN PATENT DOCUMENTS

CN　　201791432　　4/2011
CN　　203678144　　7/2014

(Continued)

*Primary Examiner* — Dung H Bui
(74) *Attorney, Agent, or Firm* — Gudrun E. Huckett

(57) ABSTRACT

The invention relates to a separator for separating a conveyed medium, preferably air, from a conveyed material (4). Said separator comprises a container (1) which has at least one feed line (3) for the conveyed medium/conveyed material mixture, at least one outlet for the conveyed material (4), and at least one outlet (8) for the conveyed medium. In order to avoid abrasion damage at high conveying speeds or to ensure that said abrasion damage occurs at most only to a small extent, while nevertheless ensuring that the conveying medium and conveying material are reliably separated, an impact wall (14), which adjoins a cover wall (15) at an angle thereto, is located in the housing (1) opposite and at a distance from the outlet end (10) of the feed line (3) in the inflow direction (13) of the conveyed medium/conveyed material mixture. Said impact wall covers the inflow path of the conveyed medium/conveyed material mixture, blocking it from the outlet (8) for the conveyed medium. The conveyed material (4) hits the impact wall (14), which causes the kinetic energy of the conveyed medium to dissipate. The speed of the conveyed medium reduces very quickly after exiting the feed line (13), meaning that it cannot entrain any conveyed material.

11 Claims, 1 Drawing Sheet

Section B-B

(56)  References Cited

U.S. PATENT DOCUMENTS

| | | | | |
|---|---|---|---|---|
| 5,042,169 | A * | 8/1991 | Vero | B65G 53/60 |
| | | | | 406/123 |
| 7,547,337 | B2 * | 6/2009 | Oh | B01D 45/04 |
| | | | | 55/424 |
| 7,740,674 | B2 * | 6/2010 | Salmon | B04C 9/00 |
| | | | | 55/318 |
| 7,833,298 | B2 * | 11/2010 | Larnholm | B01D 45/12 |
| | | | | 55/482 |
| 2007/0044437 | A1 * | 3/2007 | Larnholm | B01D 50/20 |
| | | | | 55/319 |
| 2010/0126350 | A1 * | 5/2010 | Sharma | B01D 46/0042 |
| | | | | 95/279 |
| 2015/0185062 | A1 * | 7/2015 | Ahmad | G01F 15/08 |
| | | | | 73/861.04 |
| 2016/0175749 | A1 * | 6/2016 | Suda | B01D 45/08 |
| | | | | 95/267 |
| 2018/0244482 | A1 | 8/2018 | Stark et al. | |
| 2020/0197847 | A1 * | 6/2020 | Jantes | B01D 45/16 |
| 2021/0285313 | A1 * | 9/2021 | Liébana Yeste et al. | |
| | | | | B01D 45/08 |

FOREIGN PATENT DOCUMENTS

| | | |
|---|---|---|
| CN | 205867794 | 1/2017 |
| DE | 1 049 204 | 1/1959 |
| DE | 31 24 766 | 4/1983 |
| DE | 20 2016 106 528 | 4/2018 |
| JP | S61145033 | 7/1986 |
| JP | 2009202142 | 9/2009 |

* cited by examiner

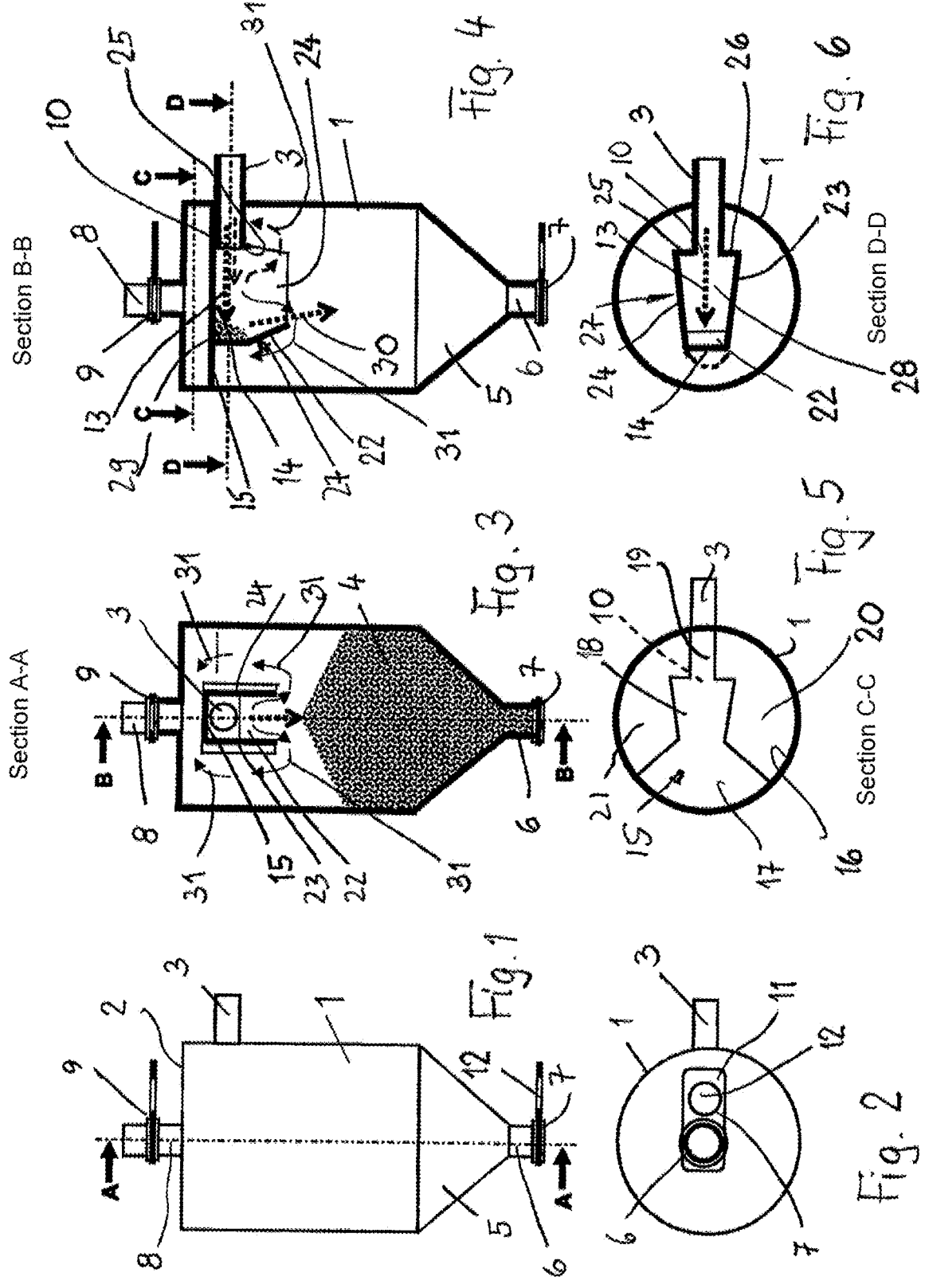

SEPARATOR FOR SEPARATING A CONVEYED MEDIUM, PREFERABLY AIR, FROM A CONVEYED MATERIAL, AND METHOD FOR SEPARATING CONVEYED MATERIAL FROM A CONVEYED MEDIUM/CONVEYED MATERIAL MIXTURE

BACKGROUND OF THE INVENTION

The invention concerns a separator for separating a conveying medium, preferably air, from a conveyed material, with a container that comprises at least one feed line for the conveying medium/conveyed material mixture, at least one outlet for the conveyed material, and at least one exit for the conveying medium. The invention concerns also a method for separating conveyed material from a conveying medium/conveyed material mixture.

Separators are used in conveying systems with which conveyed material, for example, plastic granules, are fed from silos and the like via conveying lines to a processing machine. Feeding can be realized by suction process or pressure process. The conveyed material is conveyed by means of the conveying medium, which is in general air, from the respective silo via the conveying lines to the processing machine or to another receiver. The separator has the task of separating the conveyed material from the conveying medium.

In case of suction conveyance, the separator has a filter or screen through which the conveying medium can pass but the conveyed material is retained however. The separation of conveying medium and conveyed material in case of suction conveyance can also be achieved by means of a cyclone action in which the feed line is provided tangentially in a housing of the separator.

In case of pressure conveyance of conveyed material, the separator is configured as a cyclone in order to separate by cyclone action the conveyed material from the conveying medium.

When used in the plastics industry, usually suction conveying systems are employed for small and medium output. Typical in this context is the feeding of machine hoppers, drying hoppers, and containers of metering and/or mixing devices.

Pressure conveying systems are used for medium (approximately 100 kg/h) to large outputs. Typical in this context is the feeding of storage silos (usually by tank trucks), day silos or large processing machines with a high throughput per hour.

So-called filled plastics (for example, glass fibers) are often conveyed with a conveying speed that is too high. This causes, in particular in case of a cyclone-based separation, a strong abrasion at corresponding locations of the lines. Plastics granules with glass fiber proportions that may amount to up to 40% are used more and more. When these plastics granules are conveyed at air speeds that are too high, higher than approximately 30 m/s, the abrasion damages at the line sections are partially enormous. Even when high quality materials are used, such as expensive ceramic or glass inserts, they wear very quickly.

The invention has the object to configure the separator of the aforementioned kind as well as the method in such a way that even at high conveying speeds abrasion damages are avoided or occur at most to a minimal degree, wherein still a reliable separation of conveying medium and conveyed material is ensured.

SUMMARY OF THE INVENTION

This object is solved for the separator of the aforementioned kind in accordance with the invention in that in the housing an impact wall is positioned at a distance opposite the outlet end of the feed line in flow direction of the conveying medium/conveyed material mixture and adjoins angularly a cover wall that covers the inflow path of the conveying medium/conveyed material mixture toward the exit for the conveying medium. The object is further solved for the method according to the invention in that the conveying medium/conveyed material mixture is conveyed into a housing and directed against an impact wall on which the conveyed material impacts.

The separator according to the invention has the impact wall that is located in the housing and is positioned at a distance opposite the outlet end of the feed line in the feed direction of the mixture of conveying medium and conveyed material. The impact wall adjoins angularly a cover wall that covers the feed path of the conveying medium/conveyed medium mixture toward the exit for the conveying medium. The conveyed material which is conveyed via the feed line into the container impacts on the impact wall so that the kinetic energy of the conveyed material is squelched. The conveying medium itself reduces its speed very quickly after exiting from the outlet end of the feed line so that it can flow to the exit. In this context, the speed of the conveying medium is so minimal that the conveying medium cannot entrain any conveyed material.

In the region between the impact wall and the cover wall, a conveyed material cushion is formed that covers the region of the impact wall on which the conveyed material impacts. The thus formed conveyed material cushion covers the impact wall in this region so that the conveyed material no longer impacts on the impact wall so that no or at most only negligible abrasion damages occur.

Advantageously, the feed line extends radially in relation to the housing. In this way, it is ensured that the conveyed material impacts reliably on the impact wall upon entry into the housing.

In order to facilitate the formation of a conveyed material cushion at the impact wall, the impact wall is advantageously provided with an angled end section that extends at a slant in the direction toward the outlet of the housing. The angled end section acts as an additional brake for the conveyed material cushion that forms at the impact wall. It therefore does not slide downwardly away from the impact wall during the conveying process but remains in its position covering the impact wall.

In a preferred embodiment, the impact wall is part of a separation enclosure that comprises a separation space for the mixture of conveying medium and conveyed material. The separation space is limited in feed direction of the mixture by the impact wall.

Preferably, sidewalls adjoin the impact wall and laterally delimit the separation space. In this way, it is ensured that the mixture of conveying medium and conveyed material conveyed via the feed line cannot flow past the impact wall. The sidewalls can serve as lateral guides for the conveying medium/conveyed material mixture in order to guide it to the impact wall.

In a further preferred embodiment, the separation space is delimited at the side which is positioned opposite the impact wall by at least one transverse wall that adjoins the feed line. Thus, a separation enclosure results in which the separation space is delimited by the impact wall, the cover wall, the sidewalls, and the transverse wall. The mixture of conveying medium and conveyed material which is entering via the feed line passes into this separation space whereby, due to the various walls, it is ensured that the entire bulk material that flows in from the feed line reaches the impact wall. The separation enclosure is open in downward direction at the side positioned opposite the cover wall so that the conveying medium as well as the conveyed material can leave the separation space.

Advantageously, the impact wall extends curved in circumferential direction of the housing, preferably approximately semi-circular.

Advantageously, the cover wall closes the separation space toward the exit for the conveying medium. It therefore flows downwardly out of the separation space of the separation enclosure. The conveyed material can also fall downwardly out of the separation space into the housing.

The outlet of the housing is advantageously provided with an outlet valve with which the outlet, depending on the desired function of the separator, can be opened or closed.

Advantageously, the exit is also provided with an exhaust air valve with which the exit can be opened or closed selectively. During the conveying process, the exhaust air valve is open so that the conveying medium, after entering the housing, can be guided out of the housing through the exit The separator according to the invention is advantageously a unit that can be connected to a processing machine for the conveyed material, for example.

In another advantageous embodiment, the separator itself is formed by a machine hopper of a processing machine for the conveyed material. In this case, the separation enclosure can be inserted directly into the machine hopper. In this way, an outlet valve is not required. Instead, an exhaust air socket can be inserted that has a large conveying line cross section.

So that the conveying medium can reach in a simple manner the exit of the housing, at least one passage for the conveying medium is provided between the cover wall and the inner wall of the housing.

In the method according to the invention, the mixture of conveying medium and conveyed material is conveyed into the housing of the separator in such a way that it is impacting against an impact wall which is arranged in the housing.

Advantageously, the feed speed of the conveyed material is so high that it forms at the impact wall a conveyed material cushion whose gravitational force is less than the force which is acting on the conveyed material cushion due to kinetic energy of the conveyed material flow. The conveyed material cushion covers thus the impact wall so that the conveyed material does not impact on the impact wall but on the conveyed material cushion.

The subject matter of the invention results not only from the subject matter of the individual claims but also from all specifications and features disclosed in the drawings and the description. They are claimed as important to the invention even though they are not subject matter of the claims insofar as, individually or in combination, they are novel in respect to the prior art.

Further features of the invention result from the further claims, the description, and the drawings.

BRIEF DESCRIPTION OF THE DRAWING

The invention will be explained in more detail with the aid of an embodiment illustrated in the drawing. It is shown in:

FIG. 1 a separator according to the invention in side view;
FIG. 2 a plan view of the separator according to FIG. 1;
FIG. 3 a section along the line A-A in FIG. 1;
FIG. 4 a section along the line B-B in FIG. 3;
FIG. 5 a section along the line C-C in FIG. 4;

FIG. 6 a section along the line D-D in FIG. 4.

DESCRIPTION OF PREFERRED EMBODIMENTS

The separator has a cylindrical housing 1 into which, near the housing cover 2, a feed line 3 opens through which a conveyed material 4 is fed in. The conveyed material 4 is fed pneumatically by means of suction or pressure conveyance to the separator. The conveyed material can be, for example, bulk material, granules, free flowing powder, and the like.

The housing 1 tapers in the lower region 5 in a funnel shape and comprises at the free end an outlet socket 6 that can be closed by an outlet valve 7.

In the cover 2 of the housing 1, there is an exhaust air socket 8 that can be closed off by an exhaust air valve 9.

The feed line 3 opens radially into the housing 1 near the cover 2. As shown in FIG. 4, the part of the feed line 3 which is positioned inside of the housing 1 has a length that is smaller than the radius of the housing 1.

Viewed in plan view of the housing 1, the exhaust air socket 8 is positioned at a radial distance adjacent to the outlet end 10 of the feed line 3.

The separator is seated in a known manner on a processing machine with which the conveyed material 4 can be processed.

In the illustrated and described embodiment, the conveyed material 4 is first collected in the housing 1 in that the outlet socket 6 is closed by the outlet valve 7. The outlet valve 7 has a slide 11 that comprises a through opening 12 (FIG. 2). In the position according to FIGS. 1 and 2, the slide 11 closes the outlet socket 6 so that the conveyed material 4 cannot escape downwardly from the housing 1.

When the conveyed material 4 is conveyed via the feed line 3 into the housing 1, the outlet valve 7 is closed and the exhaust air valve 9 open. In this way, the conveying air with which the conveyed material 4 is transported into the housing 1 can flow out upwardly through the exhaust air socket 8.

FIG. 4 shows the separator during the conveying process. The conveyed material is conveyed with the air in the direction of the flow arrow 13 via the feed line 3 into the housing 1. In flow direction at a distance in front of the outlet end 10 of the feed line 3, a wall 14 that is positioned transversely to the flow direction 13 is provided on which the conveyed material 4 and the air impact. The wall 14 projects transversely, preferably perpendicularly, away from a cover plate 15 which is fastened in the housing 1 at a minimal distance below the cover 2. The cover plate 15 is positioned parallel to the cover 2 and adjoins the inner wall 16 of the housing 1 diametrically opposite the feed line 3.

In the illustrated embodiment, the wall 14 extends straight, viewed in axial direction of the housing 1 (FIG. 6). It is advantageous when the wall 14, at least approximately, is of a semi-circular shape, viewed in axial direction of the housing 1. This shape of the wall 14 is indicated in FIG. 6 by a dashed line.

As can be seen in FIG. 5, the cover plate 15 has a circular sector-shaped section 17 which extends across an angle range of approximately 90° and which is fastened with its curved rim at the housing inner side 16. At a distance away from the housing inner wall 16, the section 17 passes into a section 18 that widens in width continuously in the direction toward the feed line 3. At a distance from the housing inner wall 16, the section 18 adjoins a radially extending section 19 which extends all the way to the inner wall 16 of the housing 1 and covers the part of the feed line 3 which is located within the housing 1. It is fastened in a suitable manner to the bottom side of this section.

The section 18 ends at a distance in front of the housing inner wall 16. Between the cover plate 15 and the housing inner wall 16, through passages 20, 21 for the air are formed via which the air can flow to the exhaust air socket 8.

The wall 14 projects away from the side of the cover plate 15 which is facing the outlet socket 6. It comprises at a distance from the cover plate 15 an end section 22 (FIG. 4) that extends at a slant thereto and at a slant to the rear and opposite to the flow direction 13. The wall 14 with the end section 22 connects two sidewalls 23, 24 to each other that diverge away from the wall 14 in the direction toward the feed line 3 (FIG. 6). At the level of the outlet end 10 of the feed line 3, the sidewalls 23, 24 pass into transverse walls 25, 26 which adjoin the feed line 3 at a right angle at the level of the outlet end 10. The transverse walls 25, 26 have only such a height that the feed line 3 at its outlet end 10 can be connected to the transverse walls 25, 26. The sidewalls 23, 24 as well as the wall 14 that have the same height project past the transverse walls 25, 26 in the direction toward the outlet socket 6.

In deviation from the illustrated embodiment, the cover plate 15 can also be configured such that it ends at the level of the outlet end 10 of the feed line 3. At this end, a transverse wall that projects transversely, preferably perpendicularly, in downward direction from the cover plate 15 adjoins the cover plate 15. The transverse wall is provided with an opening to which the feed line 3 is connected inside of the housing 1.

The cover plate 15 with the wall 14, 22, the sidewalls 23, 24, and the transverse walls 25, 26 forms a separation enclosure 27 that ensures that the conveyed material 4 can be separated reliably from the air inside the housing 1.

The wall 14, 22, the cover wall 15, the sidewalls 23, 24, and the transverse walls 25, 26 form a separation space 28 in which the separation of the conveyed material 4 from the air takes place.

The walls 4, 22 to 26 have a sufficiently large distance from the outlet socket 6 so that in the housing 1 a correspondingly large quantity of bulk material can be stored (FIG. 3).

The sidewalls 23, 24 can be embodied so as to be rounded in a direction toward each other at the lower rim in the region of the feed line 3. This configuration has the advantage that more conveying air flows to the exhaust air socket 8.

The separation enclosure 27 is open in direction toward the outlet socket 6 so that the conveyed material 4 as well as the air flowing in through the feed line 3 can exit reliably from the separation space 28 of the separation enclosure 27.

Via the feed line 3, the conveyed material/air mixture enters the separation space 28 of the separation enclosure 27 at maximum air speed. The conveyed material 4 as well as the air impact on the wall 14 which is positioned in flow direction 13 in front of the feed line 3 and forms an impact wall at which the kinetic energy that the conveyed material 4 has is squelched. The conveyed material 4 impacts at high kinetic energy almost perpendicularly on the wall 14. In the corner region between the wall 14 and the cover plate 15, a cushion 29 (FIG. 4) is formed in the separation space 28 that is formed by a portion of the conveyed material 4. Due to the conveyed material which is flowing in continuously via the feed line 3 during the conveying process, the cushion 29 gets stuck in this region. The thickness of the cushion 29 depends on the bulk weight of the conveyed material 4 and the air speed by means of which also the speed of the conveyed material 4 is determined. The force which is acting on the cushion 29 by the incoming conveyed material 4 is larger than the gravitational force of the cushion 29 that therefore gets stuck within the separation space 28 during the conveying process. Only once the conveying process is stopped and no conveyed material/air mixture passes through the feed line 3 into the housing 1, the cushion 29 falls downwardly into the housing 1 as a result of its gravitational force. This is indicated by the arrow 30 in FIG. 4.

The formation of the cushion 29 is advantageously favored when the wall 14 is curved, preferably is designed approximately semi-circular.

Upon entry of the air in the separation space 28 of the separation enclosure 27, the air speed, due to the larger expansion space in the separation enclosure 27 in comparison to the feed line 3, decreases rapidly so that the air can flow out of the separation space 28 in the direction of the flow arrows 31 upwardly through the passages 20, 21 in upward direction to the exhaust air socket 8.

During the described filling process, the outlet valve 7 is closed while the exhaust air valve 9 is open. As soon the conveying process is terminated, the exhaust air valve 9 can be closed.

The formation of the cushion 29 is favored in that the angled end section 22 adjoins the wall 14 and is arranged at a slant opposite to the flow direction 13. It acts as an additional safety means for the cushion 29 not to slide downwardly as long as the housing 1 is being filled with conveyed material 4. The cushion 29 forms an abrasion protection by means of which it is prevented that the wall 14 prematurely wears due to the impact of the conveyed material 4.

The wall 14 can be designed straight but also curved about its circumferential length.

The air which is exiting from the separation space 28 of the separation enclosure 27 has only a minimal speed so that, when it is sucked away from the exhaust air socket 8, it cannot entrain any conveyed material 4. In the region of the passages 20, 21, the air has its minimal flow speed.

In order to supply the conveyed material 4 contained in the housing 1 to a downstream processing machine, the outlet valve 7 is opened so that the conveyed material 4 can fall out downwardly. Subsequently, the outlet valve 7 is closed again and a new conveying process is started in which the exhaust air valve 9 is open again.

The ratio of the kinetic energy of the conveying air to the conveyed material 4 is in general at 1 to approximately 500 to 800. As a result of the high kinetic energy, the conveyed material 4, after exit from the feed line 3, changes its direction and its speed only insignificantly due to the mass inertia. The conveying air, on the other hand, with its very minimal kinetic energy loses speed very rapidly upon entering the separation enclosure 27 so that the conveying air accordingly can also change its direction. As can be seen by the flow arrows in FIGS. 3 and 4, the conveying air changes its flow direction by at least 180°. Due to the minimal speed, the conveyed material 4 is not entrained to the exhaust air socket 8 in this context.

In practice, the conveying air in the feed line 3 has a speed of 30 m/s. The conveyed material 4 impacts approximately at half the speed on the wall 14, i.e., with a high kinetic energy. It is responsible for the cushion 29 being formed in the separation space 28 and also getting stuck thereat until the conveying action is interrupted.

In the illustrated and described embodiment, the separation enclosure 27 is installed in the housing 1. Such a configuration of the separator is in particular suitable for a cyclic operation in suction range as well as pressure range.

The size of the housing 1 as well as its shape is arbitrary as long as the maximum air speed in the region of the passages 20, 21 is smaller than approximately 8 m/s.

Also, plastic processing machines are known which are provided with machine hoppers that are filled with the respective conveyed material 4. In such machines, the separation enclosure 27 is arranged in the machine hopper of the machine. Thus, an outlet valve is not required.

The connection between the machine hopper and, for example, a plastifying screw of the machine is always configured to be pressure-tight for a suction conveyance as well as for a pressure conveyance.

The separation enclosure 27 can be used also for the continuous operation in the pressure range, i.e., for a pressure conveyance. Instead of the exhaust air valve 9, an exhaust air socket, large in cross section, is provided in this context that, for example, has a flow cross section that corresponds to up to 6 times the flow cross section of the feed line 3.

The described separator is suitable for the pneumatic conveyance in the pressure range as well as in the vacuum range. It can be used for small and large conveying outputs. When the conveying action of the conveyed material 4 is realized by means of compressed air, then an outlet valve and an exhaust air valve are not required, for example, when large storage silos are to be filled with the conveyed material 4 with a relatively large exhaust air opening. Due to the cushion 29, no or at most negligible signs of wear by abrasion occur at the wall 14. The separator does not require a large structural volume. As a result of the described configuration with the separation enclosure 27, a separation of the conveyed material 4 from the air flow is possible within a smallest space.

The separator can be utilized as a charge storage for refilling consumers, such as a processing machine, drying hopper, mixer and the like.

In the suction range, i.e., for the vacuum conveyance of the conveyed material 4 as the most important application, a filter or a screen is not required in order to separate the conveying air from the conveyed material 4. In this way, a filterless suction conveying device can be used in an advantageous manner.

The housing 1 of the separator can comprise, instead of the advantageous cylinder shape, also other suitable cross section shapes without the described separation of conveying air and conveyed material 4 by means of the separation enclosure 27 being impaired thereby.

What is claimed is:

1. A separator for separation of a conveying medium from a conveyed material, the separator comprising:

a housing comprising an outlet for the conveyed material and an exit for the conveying medium;

a feed line configured to convey a mixture of the conveying medium and of the conveyed material into the housing;

an impact wall positioned in the housing at a distance opposite an outlet end of the feed line in a flow direction of the mixture of the conveying medium and of the conveyed material;

a cover wall arranged in the housing and covering an inflow path of the mixture of the conveying medium and of the conveyed material toward the exit;

a separation enclosure comprising a separation space for the mixture of the conveying medium and of the conveyed material, wherein the impact wall is a part of the separation enclosure and delimits the separation space in the flow direction;

wherein the separation enclosure comprises sidewalls adjoining the impact wall and extending toward the feed line, wherein the sidewalls delimit laterally the separation space;

wherein the separation enclosure comprises a transverse wall arranged opposite the impact wall and delimiting the separation space opposite the impact wall, wherein the transverse wall is connected at a right angle to the outlet end of the feed line and extends away from the outlet end of the feed line in opposite directions toward the sidewalls and is connected to ends of the sidewalls facing away from the impact wall;

wherein the separation enclosure is wider than the outlet end of the feed line and is an expansion space reducing a flow speed of the conveying medium entering the separation enclosure so that the conveyed material is not entrained toward the exit by the conveying medium;

wherein the sidewalls and the impact wall project past the transverse wall in a direction toward the outlet.

2. The separator according to claim 1, wherein the feed line extends radially in relation to the housing.

3. The separator according to claim 1, wherein the impact wall comprises a vertical section adjoining perpendicularly the cover wall and further comprises an end section connected to the vertical section at an end thereof remote from the cover wall, wherein the end section is angled in a direction toward the outlet and extends away from the vertical section.

4. The separator according to claim 1, wherein the cover wall closes the separation space toward the exit.

5. The separator according to claim 1, wherein the outlet is provided with an outlet valve.

6. The separator according to claim 1, wherein the exit is provided with an exhaust air valve.

7. The separator according to claim 1, wherein the separator is a unit connectable to a processing machine configured to process the conveyed material.

8. The separator according to claim 1, wherein the separator is a machine hopper of a processing machine configured to process the conveyed material.

9. The separator according to claim 1, wherein between the cover plate and an inner wall of the housing a passage for the conveying medium is provided, wherein the passage is open toward the exit.

10. The separator according to claim 1, wherein the sidewalls are planar.

11. A separator for separation of a conveying medium from a conveyed material, the separator comprising:

a housing comprising an outlet for the conveyed material and an exit for the conveying medium;

a feed line configured to convey a mixture of the conveying medium and of the conveyed material into the housing;

an impact wall positioned in the housing at a distance opposite an outlet end of the feed line in a flow direction of the mixture of the conveying medium and of the conveyed material;

a cover wall arranged in the housing and covering an inflow path of the mixture of the conveying medium and of the conveyed material toward the exit;

a separation enclosure comprising a separation space for the mixture of the conveying medium and of the conveyed material, wherein the impact wall is a part of the separation enclosure and delimits the separation space in the flow direction;

wherein the separation enclosure comprises sidewalls adjoining the impact wall and extending toward the feed line, wherein the sidewalls delimit laterally the separation space;

wherein the separation enclosure comprises a transverse wall arranged opposite the impact wall and delimiting the separation space opposite the impact wall, wherein the transverse wall is connected at a right angle to the outlet end of the feed line and extends away from the outlet end of the feed line in opposite directions toward the sidewalls;

wherein the sidewalls diverge away from the impact wall in a direction toward the feed line and wherein ends of the sidewalls facing away from the impact wall are connected to opposite ends of the transverse wall;

wherein the separation enclosure is wider than the outlet end of the feed line and is an expansion space reducing a flow speed of the conveying medium entering the separation enclosure so that the conveyed material is not entrained toward the exit by the conveying medium;

wherein the sidewalls and the impact wall project past the transverse wall in a direction toward the outlet.

* * * * *